May 26, 1970     T. F. BRAY     3,514,275
LIGHTWEIGHT TELESCOPE MIRROR BLANK PRODUCT AND
PROCESS OF PRODUCING THE SAME FROM GLASS
Filed Oct. 18, 1965     2 Sheets-Sheet 1

INVENTOR.
THOMAS F. BRAY
BY
ATTORNEYS

May 26, 1970    T. F. BRAY    3,514,275
LIGHTWEIGHT TELESCOPE MIRROR BLANK PRODUCT AND
PROCESS OF PRODUCING THE SAME FROM GLASS
Filed Oct. 18, 1965    2 Sheets-Sheet 2

INVENTOR.
THOMAS F. BRAY
BY *H. A. Schaich*
*and*
*Charles S. Lynch.*
ATTORNEYS ised May 26, 1970

3,514,275
LIGHTWEIGHT TELESCOPE MIRROR BLANK
PRODUCT AND PROCESS OF PRODUCING
THE SAME FROM GLASS
Thomas F. Bray, Toledo, Ohio, assignor to Owens-Illinois,
Inc., a corporation of Ohio
Filed Oct. 18, 1965, Ser. No. 496,966
Int. Cl. C03b 29/00, 31/00; G02b 5/08
U.S. Cl. 65—33                                    8 Claims

ABSTRACT OF THE DISCLOSURE

Lightweight glass or glass-ceramic plates, especially telescope mirror blanks, are formed by thermally uniting a plurality of self-fitting glass or glass-ceramic units, each unit having at least one cavity disposed between its face surfaces and one of the face surfaces being provided with at least one opening communicating with the cavity and the atmosphere and smaller in cross-sectional area than the cross-sectional area of the cavity. Thermally crystallizable self-fitting glass units can be used and these can be thermally crystallized before or after the units are joined to form the lightweight article.

---

This invention relates to a process for forming lightweight glass articles and, more particularly, to a process for forming lightweight, low-expansion telescope mirror blanks. In a further aspect, the present invention also relates to products produced by the aforesaid process.

Telescope mirror blanks of large diameter and thickness present a special and difficult problem in the casting thereof and, after the reflecting surface has been carefully ground, polished, figured, and coated, in the subsequent handling and mounting of these mirrors in the telescopes. Due to the enormous weight of the larger mirrors, complex mounting means must be utilized for supporting the mirror in the telescope, care being taken to assure that the mirror is always in strain-free condition, irrespective of its position as the telescope is moved to observe different areas of the sky.

Since the condition and configuration of the reflecting surface of the finished mirror determines the accuracy of the reflected image, and since the mirror must be of sufficient rigidity so as to prevent even the slightest movement or distortion of the reflecting mirror surface, the thickness of the mirror must be substantial in order to insure such rigidity. Attempts have been made in the past to lighten the overall weight of such telescope mirrors by forming a mirror blank of a minimum thickness and then subsequently bonding the undersurface of the mirror blank to glass members of the same composition, which members, as a whole, impart a certain rigidity to the ultimate reflecting mirror. One example of this is the use of "egg crate" construction wherein a plurality of elongated glass strips having spaced, slotted portions along one longitudinally extending edge are interconnected with a plurality of similar glass strips extending at right angles thereto, the connection being at the respective slotted portions, so that the final structure is of the same thickness or height as the individual strip, just as in the case of the interconnected cardboard members used with an egg crate to separate the individual eggs.

However, due to the overall size of the glass strips, and the thickness of the mirror blank, considerable problems occur when the glass strips are subjected to temperatures sufficient to fuse them together along adjoining portions, and also fuse the upper surface of the interlocked "egg crate" structure to the bottom surface of the mirror blank. A glass backup plate of sufficient thickness to impart rigidity to the mirror must also be fused to the undersurface of the "egg crate" structure. Since the capping of large mirrors is a very delicate operation and the temperature to which the glass is subjected as it is being cooled has to be very carefully controlled, it will be apparent that serious problems occur as soon as an attempt is made to fuse the "egg crate" glass structure to the bottom surface of the glass mirror blank and to the backup plate. To do this successfully is a tedious, time-consuming operation, which adds considerably to the cost of the final product.

One solution to the numerous problems presented by the requirements for telescope mirror blanks resides in the use of a one-piece, lightweight, vitreous telescope mirror blank having a pair of oppositely disposed face surfaces and a plurality of separate cavities disposed between the surfaces. One of the surfaces is provided with a plurality of openings, each of which is disposed opposite one of the cavities and communicates with the cavity. Each opening is considerably smaller in cross-sectional area than the cross-sectional area of the cavity. While telescope mirror blanks of this type have proven to be superior to other previously employed structures, even these blanks are difficult to fabricate, particularly when the blank is large. Additionally, if a flaw is discovered in one portion of the blank, after assembly, the entire blank must be discarded.

Accordingly, it is an object of this invention to provide a process for forming a lightweight, reflecting, vitreous mirror blank for a telescope, which process avoids the disadvantages which exist in the prior art.

Another object of the present invention is to provide a process for forming lightweight glass plates which process avoids the shortcomings and drawbacks of prior known methods.

It is another object of this invention to provide a process for forming a lightweight, low-expansion, vitreous telescope mirror blank wherein the surface of the blank can be ground, polished, figured, and coated, whereby the resulting mirror, when mounted within a telescope, is of a rigidity sufficient to prevent any distortion of the reflecting surface.

Still another object of this invention is to provide a process for making a lightweight, transparent, thermally crystallized glass-ceramic telescope mirror blank having a low coefficient of lineal thermal expansion, wherein the mirror blank has a plurality of separate cavities disposed throughout its interior and communicating to the atmosphere through small openings in one surface of said blank, the volume of these cavities being such that the overall weight of the mirror blank is considerably reduced.

A still further object of the present invention is to provide a process for making transparent lightweight, thermally crystallized glass ceramic telescope mirror blanks having an essentially zero coefficient of lineal thermal expansion.

A further object of this invention is to provide a simple and reliable process for forming lightweight, transparent, telescope mirror blanks which process permits an efficient means for controlling the quality of the blanks.

Still a further object of the present invention is to provide lightweight glass articles produced in accordance with the aforesaid processes.

In attaining these objects, one feature resides in providing a plurality of glass units, each unit having a pair of oppositely disposed face surfaces and at least one cavity disposed between the face surfaces. One of the face surfaces is provided with at least one opening, said opening being in communication wtih the cavity and considerably smaller in cross-sectional area than the cross-sectional area of the cavity. The glass units are thermally joined to adjacent units to form a one-piece, lightweight telescope mirror blank.

Another feature resides in providing a plurality of glass units each unit having a pair of oppositely disposed face surfaces, one of which is concave. Each unit has at least one cavity disposed between its face surfaces and one of the face surfaces is provided with an opening communicating with the cavity and being smaller in cross-sectional area than the cross-sectional area of the cavity. These units are placed in a mold in contact with each other and the concave surface of each unit disposed toward the surface of the mold. The units are then heated to a temperature sufficient to thermally join the units and cause them to collapse on the mold support. A one-piece, lightweight telescope mirror blank is thereby produced.

Still another feature resides in thermally uniting a plurality of hollow glass units, each unit having at least one opening on its face surface communicating with the interior cavity of the unit and being formed of a thermally crystallizable glass, preferably of the $SiO_2$-$Al_2O_3$-$Li_2O$ system, to form a telescope mirror blank and subjecting the blank to a particular heat treatment schedule until the glass is thermally crystallized in situ. A low-expansion, transparent telescope mirror blank is thereby produced, containing as predominant crystalline phases lithium-containing crystalline phases, either as beta-eucryptite or beta-eucryptite-like crystals, or as beta-spodumene or as beta-spodumene-like crystals, or both, as indicated by X-ray diffraction data. A multitude of such crystalline phases in random orientation and dispersed in a glassy matrix remaining as a result of the in situ crystallization, are to be found in the glass-ceramic mirror blank of the invention. Preferably, substantially all of the crystals of the glass-ceramic are of a diameter less than one-third micron, measured along the largest lineal dimension of the crystals.

A still further feature of the present invention resides in forming a plurality of thermally crystallizable glass units, each unit having a pair of oppositely disposed face surfaces and at least one cavity disposed between the face surfaces, wherein one of the face surfaces is provided with at least one opening in communication with the cavity and of considerably smaller cross-sectional area than the cross-sectional area of the cavity. The glass units are then subjected to a thermal in situ crystallization to produce a crystallized glass cermaic unit formed of a multiplicity of crystals in a glassy matrix, and thereafter joining the glass units together to form a lightweight telescope mirror blank.

Still another feature of this invention resides in forming a lightweight, transparent, glass-ceramic telescope mirror blank wherein the blank has a coefficient of lineal thermal expansion of from $+10 \times 10^{-7}$ to $-10 \times 10^{-7}$ per ° C. (0–300° C.) and preferably of about 0, depending upon the composition and the heat treatment to which it is subjected.

Other objects, features, and advantages of the invention will become more apparent from the following discussion of the invention taken in conjunction with the drawings, wherein.

Figure 2:
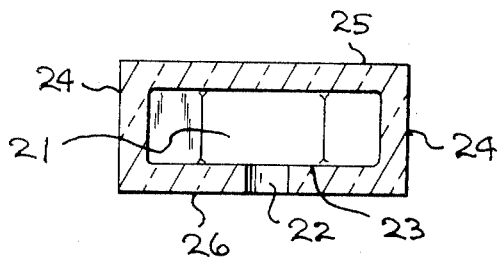
FIG. 2 is a cross-sectional view taken along line 2—2 of FIG. 1.
Figure 1:
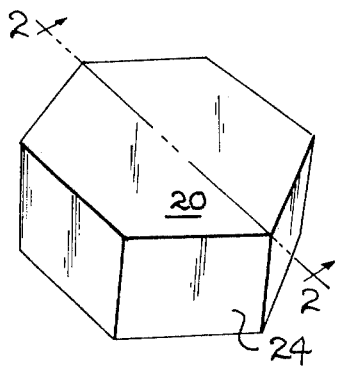
FIG. 1 is a three-quarter view of a glass unit useful in the process of this invention.

In accordance with this invention, lightweight glass telescope mirror blanks are fabricated by uniting hollow glass units. As shown in FIGS. 1 and 2, glass units 20 have face surfaces 25 and 26, side surfaces 24, and an interior cavity 21, disposed between face surfaces 25 and 26. An opening 22, smaller in cross-sectional area than the cross-sectional area of cavity 21, is disposed below and communicates with cavity 21.

While unit 20 is shown in FIGS. 1 and 2 as having a single interior cavity 21, each unit 20 can have a plurality of interior cavities 21, each cavity having an opening 22 communicating therewith. The units 20 can be of any self-fitting, polygonal shape. Thus, units 20 can have face surfaces which are hexagonal, triangular, rectangular, square, sectoral, etc. Furthermore, interior cavities 21 can be of any geometric configuration in cross section, including circular, square, rectangular, hexagonal, triangular, sectoral, octagonal, etc. Cavity 21 does not have to be of the same configuration as face surfaces 25 and 26 of unit 20.

Figure 3:
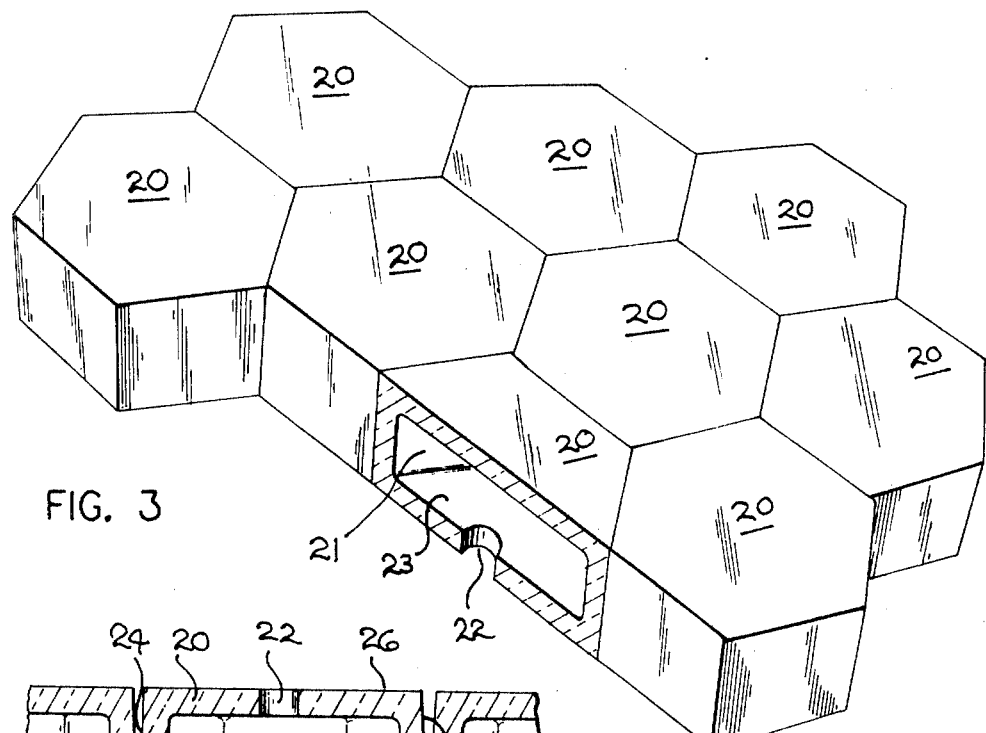
FIG. 3 is a partially cut away three-quarter view of a telescope mirror blank fabricated in accordance with the process of this invention.
Figure 4:
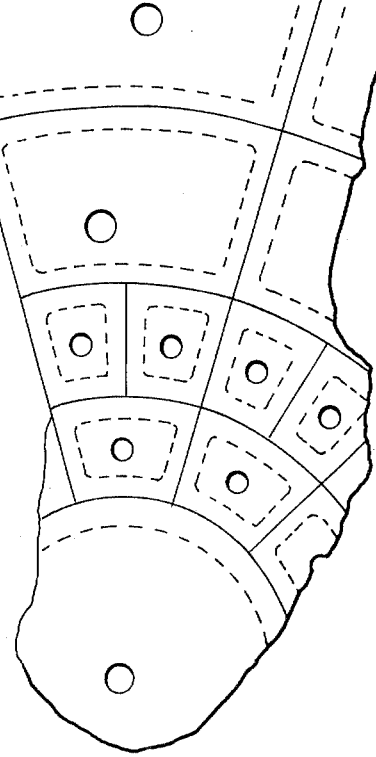
FIG. 4 is a plan view of a telescope mirror blank fabricated in accordance with this invention.
Figure 5:
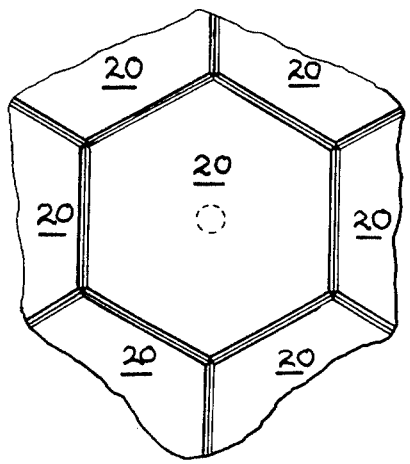
FIG. 5 is a plan view of adjacent units arranged according to one aspect of this invention prior to fusion.

The telescope mirror blank is formed by placing a plurality of units 20 in a mold as a self-fitting array and joining each unit to adjacent units by fusion or the use of a sealing glass. The resulting mirror blank has a pair of oppositely disposed face surfaces and a plurality of separate cavities between the surfaces. One of the surfaces is provided with a plurality of openings, each of which is disposed opposite one of the cavities and communicates with the cavity. Each opening is considerably smaller in cross-sectional area than the cross-sectional area of the cavity. Products of this type are shown in FIGS. 3 and 4.

Figure 9:
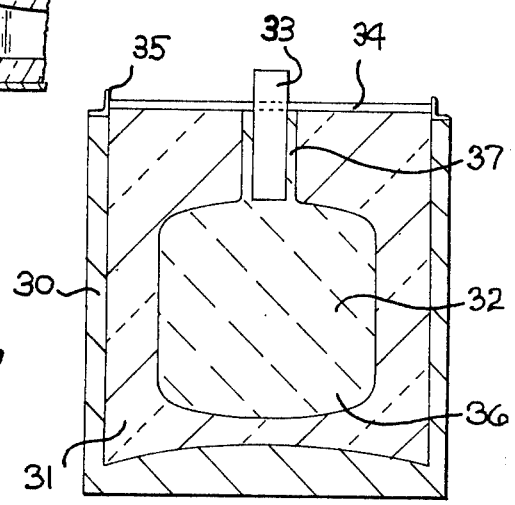
FIG. 9 is a cross-sectional view of a mold which is used to form the glass units employed in the process of the present invention.

As shown in FIG. 9 the units 20 are fabricated by pouring a molten vitreous mass 31 into an annular mold 30 which is provided with a downwardly extending pin 33, secured to mold 30 by bar 34 inserted into bar holder 35.

Removably secured to pin 33 is a shaped module or cavity-forming unit 32. Module 32 has a body portion 36 and a neck portion 37 integral therewith and removably disposed about pin 33 so that neck portion 37 completely shields pin 33 from the molten vitreous mass 31.

The shaped module 32 can be formed of a material which is resistant to the high temperature of the molten glass. The material should be of the type which has a low coefficient of expansion and which can be readily removed from the interior of the glass unit after the unit is formed. One of many suitable materials for this purpose is a shaped, open-cell type amorphous fused silica foam formed by slip-casting silica in plaster molds to the desired shape. Suitable shaped modules can be formed by utilizing the aforesaid silica which is sold under the trademark "Glasrock Foam No. 25," by Glasrock Products, Inc., of Atlanta, Ga. The amorphous silica, which is at least 98% pure with $Al_2O_3$ being the major impurity, has a linear coefficient of thermal exapnsion of $0.54 \times 10^{-6}$ per degree C. (0–1000° C.) and can withstand thermal shocks up to 3100° F. The bulk density is between 23 and 28 pounds per cubic foot.

Alternatively, the shaped module 32 can be formed of a destructible material. When destructible materials are employed, the shaped module will be liquefied during the heat treatment, or joining process, and will flow out of interior cavity 21 through opening 22. To render the removal liquefiable module 32 more efficient, the interior wall 23 of cavity 22 can be inclined as shown in FIG. 2. Generally, the destrucible shaped module 32 can be of any material which melts at at emperature from about the annealing point of the glass to a temperature below the melting point of the glass. Ideally, the core material should have a melting point just above the melting point of the glass. Among the materials suitable for the purposes of this invention are metals such as aluminum and magnesium; alloys of aluminum, magnesium and other metals; and salts or other inorganic compounds of aluminum, magnesium, and other metals. Such materials should be relatively inert to the glass compositions utilized in the process of the invention. Other suitable destructible core materials are described in copending application Ser. No. 503,831, filed Oct. 23, 1965, by George Edman Keefer (K–8632 and K–8647), assigned to the assignee of the present application, the entire disclosure of which is in corporated herein by reference.

If the shaped module is formed of a high temperature resistant material, it can be removed from the interior of the unit 20 by chipping through opening 22 with a suitable tool after unit 20 has been cast and removed from mold 30. Alternatively, the high temperature-resistant shaped module 32 can be removed after unit 20 has been joined with a similar units and before or after the assembly has been subjected to a prescribed heat treatment. When destructible module materials, such as those described above, are employed, the module material is liquefied during the joining or prescribed heat treatment step and removed from the interior of the units at that time.

The methods of forming cavities in the glass units are more fully described in the copending application of Austin et al. Ser. No. 468,691, filed July 1, 1965, and of Keefer, referred to above, both of which applications are owned by the assignee of the present application. The entire disclosure of both of these applications is relied on and incorporated herein by reference.

When the units 20 are joined by fusion, they are heated to a temperature sufficient to render their walls plastic. The particular temperature employed during the fusion step will, of course, depend upon the composition of the material used to form units 20. For example, fusion may be accomplished by heating units 20 to a temperature sufficient to give the vitreous material comprising units 20 a viscosity of approximately $10^8$ to $10^7$ poises. The time required for heating to cause fusion will also vary depending on the particular glass. For example, heating glass units at the appropriate temperature for 1 to 4 hours has been found to be satisfactory.

To bring about an in situ thermal crystallization of the glass units the sealed assembly of units is subjected to a specified temperature range termed the "nucleation" range to initiate nucleation of the glass. The particular temperature utilized for this purpose will vary with individual glasses and can readily be established by known methods. For this purpose it is often convenient to express the proper conditions in terms of the viscosity of the glass. For example, it has been found that suitable nucleation occurs when the viscosity of the glass is approximately $10^{11.5}$ poises. The time required to achieve complete nucleation can vary up to as much as 1000 hours. The product is subjected to a prescribed heat treatment to effect nucleation and thereafter subjected to the crystallization temperature to crystallize the product. Illustrative of crystallization conditions is a temperature such that the viscosity of the glass is about $10^8$ poises.

Alternatively, each individual unit 20 can be subjected to the prescribed heat treatment to effect nucleation and crystallization of the vitreous composition prior to joining the units to form the telescope mirror blank. When the vitreous composition is subjected to the prescribed heat treatment prior to sealing, sealing must be accomplished at a relatively low temperature to prevent the crystallized glass from being rendered amorphous during this treatment.

As mentioned above, units 20 can be united by means of a sealing glass. When a sealing glass is employed, the glass should have approximately the same coefficient of lineal thermal expansion as does the vitreous composition comprising the units 20. The choice of particular sealing glass will vary with the glass composition of the units as will be apparent.

Figure 6:
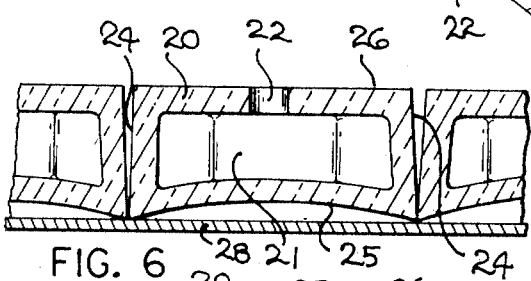
FIG. 6 is across-sectional view of FIG. 5.

The sidewalls 24 of units 20 can be vertical or can be tapered as shown in FIG. 6. As shown in FIG. 6, units 20 have one concave face surface 25 and sidewalls 24 may be tapered back so that the area of the concave face 25 is greater than that of the opposite face 26. Units 20 are placed on a refractory surface 28 with their edges touching and with their concave faces 25 adjacent the surface. When using units with vertical walls, the side walls thereof are highly finished to provide uniform contact with adjacent units. The composite is then heated to a temperature sufficient to render the walls of the units 20 plastic and to unite adjacent units. By uniting adjacent units, concave faces 25 collapse against refractory support 28 and opposite faces 26 are rendered concave.

EXAMPLE I

The following example illustrates preparation of the individual glass unit.

A thermally crystallizable molten glass having a temperature within the range of 2650° F. is poured into a split ring graphite mold having a convex bottom surface, which mold is preheated to 400° F. The mold is hexagonal in horizontal cross-section and 8″ in diameter. Immediately after pouring the molten glass into the mold, a shaped "Glasrock Foam No. 25" module of the configuration shown in FIG. 9 is lowered into the mold and immersed below the molten glass. The module is previously heated to about 800° F. prior to its immersion into the molten glass. After 5 seconds has elapsed from the immersion of the module, the pin supporting the module is removed. As soon as the viscosity of the glass increases to a point where the glass is self-supporting, the split-ring mold is opened and the glass unit which is supported by the convex bottom surface of the mold, is cooled to room temperature. The module is then chipped and scraped away and the resulting unit has the configuration shown in FIGS. 1 and 2.

EXAMPLE II

Figure 7:
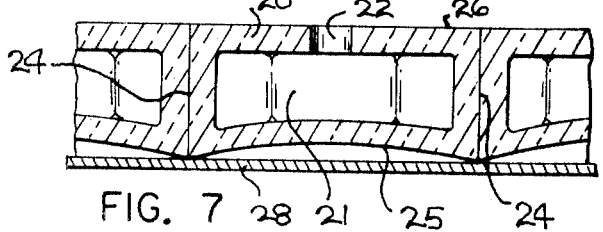
FIG. 7 is a cross section view of the glass units in contact prior to fusion according to another aspect of the invention.
Figure 8:
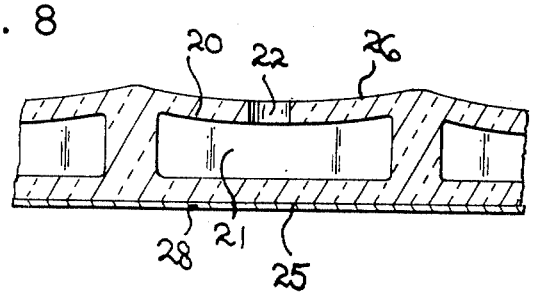
FIG. 8 is a cross-sectional view of a mirror blank and configuration of the mirror blank after fusion.

A plurality of units prepared as in Example I are placed on a refractory support as a self-fitting array with their concave surfaces adjacent the support and their side walls in contact as shown in FIG. 7. Following this, the composite is placed in an oven and heated to a temperature such that the viscosity of the glass lies in the range of $10^8$ to $10^7$ poises. One to four hours are needed to effect the fusion of the glass units at that temperature.

Thereafter, the glass assembly together with the refractory support is subjected to the heat treatment schedule to essentially completely nucleate the glass and then crystallize the glass. The heat treatment is carried out by heating the fused assembly for 64 hours at 1425° F. to achieve nucleation and then at 1550° F. for 4 hours to crystallize the product.

A transparent, thermally in situ crystallized glass-ceramic mirror blank having a plurality of cavities disposed throughout its inner portion is formed.

The thermally crystallizable glass that may be used for purposes of the present invention and, which produce a thermally, in situ, crystallized transparent glass-ceramic telescope mirror blank can be prepared by first melting together the following batch ingredients expressed in pounds and ounces:

| Ingredient: | Weight in gross |
|---|---|
| Petalite [1] | 4258.8 |
| Zircon sand [2] | 63.1 |
| Alumina [3] | 385.6 |
| High-calcium limestone [4] | 245.6 |
| Zinc oxide | 63.1 |
| Lithium chloride | 25.6 |
| Lithium $NO_3$ | 14.4 |
| Titanium dioxide [5] | 91.3 |
| Sodium antimonate | 25.0 |

[1] 4.2% $Li_2O$, 16.1% $Al_2O_3$, 77.7% $SiO_2$, 0.4% $Na_2O$, 0.027% $Fe_2O_3$, and other minor ingredients, including ignition loss.
[2] Analysis of zircon sand is 33.8% $SiO_2$, 65.5% $ZrO_2$, 0.12% $TiO_2$, 0.05% $Fe_2O_3$, 0.24% $Al_2O_3$, and 0.2% cerium oxide and possibly rare earth oxide.
[3] Weight of Alcoa A-14 alumina which is illustratively 99.5% $Al_2O_3$, 0.03% $Fe_2O_3$, 0.10% $Na_2O$, 0.08% $SiO_2$, 0.2% ignition loss at 1100° C.
[4] Limestone analyzing 55.25% CaO, 0.26% MgO, 0.5% $SiO_2$, 0.2% $Al_2O_3$, 0.05% $Fe_2O_3$, 0.001% $Cr_2O_3$, 0.03% sulfate ($SO_3$), 0.02% $P_2O_5$ and an ignition loss of 43.6%.
[5] Weight of Titanox–GM which is a nonpigmentary grade of substantially pure $TiO_2$ sold by Titanium Pigment Corporation.

This glass has the following theoretical composition and for an actual tank batch had the following analyzed composition, expressed as various oxides in weight percent:

| | Theoretical percent |
|---|---|
| $SiO_2$ | 66.33 |
| $Al_2O_3$ | 21.22 |
| CaO | 2.69 |
| ZnO | 1.25 |
| $Li_2O$ | 3.82 |
| $TiO_2$ | 1.79 |
| $ZiO_2$ | 1.97 |
| $K_2O$ | 0.19 |
| $Na_2O$ | 0.44 |
| $Sb_2O_3$ | 0.31 |

While telescope mirror blanks of the present invention may be formed utilizing known vitreous compositions which have been shown to be suitable for telescope mirrors in the past, such as fused quartz, borosilicate glass, and the like, it is preferred to utilize thermally crystallizable glasses of the $SiO_2$—$Al_2O_3$—$Li_2O$ system, capable of being thermally, in situ crystallized to form transparent glass-ceramics having a coefficient of lineal thermal expansion which is low and preferably is about zero.

Transparent, low-expansion, glass-ceramic telescope mirror blanks may be formed by thermal in situ crystallization of the preferred thermally crystallizable base glass composition of the present invention, which composition consists essentially of the following components, in the indicated percent limits, based on the total glass composition:

Component:
$SiO_2$—56–70
$Al_2O_3$—18–27
$Li_2O$—3.4–4.5
CaO—0–3
ZnO—0–2
$B_2O_3$—0–4
$TiO_2$—0–6
$ZrO_2$—0–3
MgO—0–3
$Na_2O$—0–1
$Sb_2O_3$—0–1
$P_2O_5$—0–3
$K_2O$—0–1
($SiO_2$+$Al_2O_3$)—at least 82
($SiO_2$+$Al_2O_3$+$B_2O_3$+$P_2O_5$)—86–91
(CaO+MgO+ZnO+$Na_2O$)—2.5–6
($SiO_2$+$Al_2O_3$+$P_2O_5$+$Li_2O$)—no more than 93
($TiO_2$+$ZrO_2$)—2–6 wherein the ratio of (CaO+MgO+ZnO+$Na_2O$+$B_2O_3$) to $Li_2O$ is less than 2.4 and the ratio of $SiO_2$ to $Al_2O_3$ is no more than 3.8, and preferably no more than 3.3. For uses of glasses and crystalline ceramics of the invention that require holding the formed glass objects for an extended time in temperature ranges where crystallization can take place, given long enough time, it has been found that the amount of $TiO_2$ plus $ZrO_2$ should be limited to a maximum of about 3 weight percent and that the $TiO_2$ should be limited to about 1.5 weight percent of the glass composition set forth herein. Usually the range of $TiO_2$ is from 1 to 1.5 percent in this aspect of the invention. One such use requiring such low nucleant levels is in making very large shaped objects, such as very thick telescope mirror blanks having large diameters which blanks require a very long annealing time during which the glass must not prematurely crystallize.

The transparent, crystallized glass-ceramic formed, as was formed above, contains as predominant crystalline species lithium-containing crystalline phases selected from the group consisting of beta-eucryptite or beta-eucryptite-like crystals, or as beta-spodumene or beta-spodumene-like crystals, or both as indicated by X-ray diffraction data. The ceramic contains a multitude of such crystalline species which are in random orientation throughout the ceramic and which are dispersed in the glassy matrix remaining as a result of the in situ crystallization. Substantially all of the crystals of the ceramic are of a diameter less than ⅓ micron measured along the largest lineal dimension of the crystals. The glass-ceramic has a lineal coefficient of thermal expansion of about minus $10 \times 10^{-7}$ to $10 \times 10^{-7}$ (0–300° C.) and, preferably, from —3 to $3 \times 10^{-7}$ (0–300° C.) The ultimate telescope mirror blank and telescope mirror formed therefrom is one in which the lineal coefficient of thermal expansion of the glass-ceramic is about zero. Furthermore, while the diameter of the crystals within the ceramic is preferably less than ⅓ micron measured along the largest linear dimension of the crystals, it is preferred that the crystals be of a diameter less than ¼ micron in size, and best results are evident when the diameter is less than 1/10 micron in size.

Other transparent, low-expansion, crystallized glass-ceramics formed by thermal in situ crystallization of a thermally crystallizable base glass are disclosed in copending application Ser. No. 396,011, now abandoned, filed Sept. 14, 1963, and the continuation-in-part thereof filed June 15, 1965, and in copending application Ser. No. 386,693, now abandoned, filed July 31, 1964, and the continuation-in-part application thereof filed June 15, 1965, all applications being assigned to the assignee of the present application. All of the disclosures in the aforesaid applications relating to thermally crystallizable glass compositions and the process of heat treating said compositions to form transparent, low-expansion glass-ceramics of substantial thickness and diameter are incorporated herein by reference. As fully disclosed in the aforesaid pending applications, the final coefficient of thermal expansion of the glass-ceramic is determined by the composition of the thermally crystallizable glass and by the particular heat treatment to which it is subjected.

A mirror blank having a concave surface may be made in accordance with the process disclosed in the examples by employing glass units having a concave face surface and vertical or tapered sides. Upon uniting these units at fusion temperatures, slumping occurs and the oppposite face surface is rendered concave. It will be appreciated that by making a surface of the blank concave, it will facilitate the grinding, polishing and figuring thereof to the desired configuration.

Furthermore, while graphite molds have been used in making the mirror blanks of the present invention, it is contemplated that the molds may be made of materials such as open cell type amorphous fused silica foam (Glasrock), low-expansion ceramics, and the like, which can be preheated to temperatures approaching that of the molten vitreous mass. It is preferred that when mirror blanks are to be made from a thermally crystallizable glass the cores should have rounded corners and edges. This will minimize or prevent uncontrolled crystallization of the glass occurring at sharp edges or corners. Alternatively, the cores can be annular, conical or of any suitable configuration and do not necessarily have to be rectangular.

It is to be understood, of course, that when lightweight telescope mirror blanks are to be formed from fused silica, borosilicate or other vitreous composition, the best treatment step will vary from that of the examples above, since in situ crystallization of the glass is not necessary. Such heat treatments are those well known in the mirror blank art.

In the foregoing description of embodiments of the present invention, molten vitreous composition is poured into the mold to form the individual glass units. As an alternative, the mold may be filled with vitreous collet which is then heated to a temperature sufficient to melt it within the mold. However, when the units are of fused silica, the silica powder is placed in the mold about the cavity-forming unit and then heated in a hot vacuum furnace of standard design until the silica is fused.

A transparent, low-expansion telescope mirror blank of the present invention, formed by the process disclosed herein, has its base plate surface, which is preferably concave, ground polished and figured, i.e., a proper parabolic curve is formed on the surface. A thin coating of aluminum is then applied to the prepared surface in a conventional manner to form the reflecting surface.

In the foregoing description of the method of the present invention when using a thermally in situ crystallizable glass, the molded glass unit is cooled in the mold until its viscosity increases sufficiently to be self-supporting at its periphery, then it is removed from the mold, cooled further as described and subjected to thermal treatment for the in situ crystallization or fused to adjacent units followed by thermal treatment for the in situ crystallization. When the glass is subjected to thermal treatment prior to uniting the units to form the mirror blank, all or part of the mold may be removed at any time prior to uniting the units and, likewise, only part of the mold may be removed instead of all of it when the glass upon cooling has increased to the extent that the glass is self-supporting at the periphery. Thus the present invention provides a particularly efficient way of controlling the quality of mirror blanks by permitting the removal of any unit that may have a defect therein and replacement with a perfect unit. It is therefore not necessary to discard the entire blank upon discovery of an imperfection as is necessary in other methods of producing blanks. It will be apparent that the foregoing applies to the initial stages of uniting or adhering the single units together.

If an opaque mirror blank is desired, it is only necessary to subject the crystallizable glass units, or the transparent crystallized glass-ceramic units to a further heat treatment at an increased temperature, such as 1600–1900° F. The additional heating step is continued until the units are rendered opaque by the additional crystallization. Care must be taken not to impart to the opaque crystallized units a high coefficient of thermal expansion and it is preferred to have the coefficient below $20 \times 10^{-7}$ (0–300° C.).

While the invention has been discussed in terms of a telescope mirror blank, it will be appreciated by those in the art that the process can be utilized in forming lightweight glass or glass-ceramic articles of substantial thickness, having a plurality of cavities disposed therein and communicating with the atmosphere through openings passing from the cavities through one surface of the article. The cross-sectional area of such openings is substantially smaller than the cross-sectional area of the cavities.

In this specification, as in the above-mentioned pending applications, the terms beta-eucryptite crystals and beta-eucryptite-like crystals have been used in an alternative sense. Thus, while beta-eucryptite is often thought of as the species crystal having one mole of lithia, one mole of alumina and 2 moles of silica, both terms are used in this application to designate crystalline species having the beta-eucryptite structure, as shown by X-ray diffraction, but the peaks can be shifted slightly depending upon whether there is a definite amount of silica present other than exactly 2 moles, either more or less silica than the 2 moles. Similarly, the terms beta-spodumene crystals and beta-spodumene-like crystals are used alternatively and in a generic sense, specifying crystalline species that have the crystalline structure of beta-spodumene that contains 4 moles of silica to one of alumina and one of lithia, but with the peaks shifted somewhat when the crystalline structure contains more or less than 4 moles of silica.

What is claimed is:

1. A process for forming a lightweight telescope mirror blank comprising:

providing a plurality of self-fitting glass units, each unit having a pair of oppositely disposed face surfaces and at least one cavity disposed between said surfaces, one of said face surfaces being concave, the other of said face surfaces being provided with at least one opening communicating with said cavity and being smaller in cross-sectional area than the cross-sectional area of said cavity, placing a plurality of said units in a mold with the concave surface of each unit adjacent the bottom surface of the mold and with said opening communicating to the atmosphere, and heating said units to a temperature sufficient to render the walls of the units plastic, causing the concave face surface of each unit to collapse against the bottom surface of the mold, and fusing the side walls of each unit to the side walls of adjacent units, to thereby form a one-piece lightweight telescope mirror blank.

2. The process of claim 1 wherein the side walls of said units are tapered back so that the area of the concave face surface of each unit is greater than that of the oppositely disposed face.

3. A process for forming a lightweight, low expansion, transparent, glass-ceramic telescope mirror blank comprising:

providing a plurality of self-fitting thermally crystallizable glass units, each unit having a pair of oppositely disposed face surfaces and at least one cavity disposed between said face surfaces, one of said face surfaces being provided with at least one opening, said opening communicating with said cavity and being smaller in cross-sectional area than the cross-sectional area of said cavity, placing said units in a mold in contact with each other and with said opening communicating to the atmosphere, heating said units to a temperature sufficient to render the walls of the units plastic and thermally join the side walls of each unit to the side walls of adjacent units, and subjecting the resulting glass assembly to a heat treatment for a period of time and at a temperature sufficient to thermally in situ crystallize said glass to form a transparent glass-ceramic telescope mirror blank.

4. A process of making a lightweight transparent low-expansion telescope mirror blank comprising:

providing a plurality of self-fitting glass units, each unit having a pair of oppositely disposed face surfaces, and at least one cavity disposed between said surfaces, one of said surfaces being concave, the other of said surfaces being provided with at least one opening communicating with said cavity and being smaller in cross-sectional area than the cross-sectional area of said cavity, placing a plurality of said units in a mold with the concave surface of each unit adjacent the bottom surface of the mold and with said opening communicating to the atmosphere, and heating the glass units for 1 to 4 hours until a viscosity of $10^{+8}$ to $10^{+7}$ poises is attained, to fuse together the side wall of said unit in contact and to cause the concave face surface of each unit to collapse against the bottom surface of the mold, and thereafter subjecting the sealed glass unit to the nucleation temperature range of the glass to obtain full nucleation and thereafter heating the sealed glass units to the crystallization temperature to obtain a crystallized glass ceramic telescope mirror blank.

5. A process for forming a lightweight, low-expansion, transparent glass-ceramic telescope mirror blank comprising:

providing a plurality of self-fitting thermally crystallizable glass units, each unit having a pair of oppositely disposed face surfaces and at least one cavity disposed between said surfaces, one of said face surfaces being provided with at least one opening, said opening communicating with said cavity and the atmosphere and being smaller in cross-sectional area than the cross-sectional area of said cavity, subjecting said glass units to a heat treatment for a period of time and at a temperature sufficient to thermally in situ crystallize said glass to produce a multiplicity of crystals dispersed in a glassy matrix, placing a plurality of the resulting glass ceramic units in a mold in contact with each other and with said opening communicating to the atmosphere, and heating the units to a temperature sufficient to fuse the side walls of each units to the side walls of adjacent units to form a transparent glass-ceramic telescope mirror blank.

6. A process for forming a lightweight low-expansion telescope mirror blank comprising:

forming a plurality of self-fitting glass units by bringing together in a plurality of separate molds molten glass and cavity-forming members, each member extending from one end for a minor part of its length with a relatively small cross section and followed by a relatively large cross section for at least most of the balance of its length, said molten glass encompassing all of the cavity-forming member for said balance of its length and at least that part of its length of relatively small cross section adjacent to said balance, and said glass being thermally crystallizable.

cooling the molten glass in each mold until its viscosity increases sufficiently to be self-supporting at its periphery, removing the cooled molded glass masses from the molds, placing a plurality of the resulting self-fitting glass units in a mold in contact with each other, each of said units having a pair of oppositely disposed face surfaces and at least one cavity disposed between said surfaces, one of said face surfaces being provided with at least one opening, said opening communicating with said cavity and the atmosphere and being smaller in cross-sectional area than the cross-sectional area of said cavity, heating said units to a temperature sufficient to render their walls plastic and join the side wall of each unit to the sidewall of adjacent units, adjusting the temperature of the resulting glass assembly to a temperature sufficient to nucleate the said glass thereafter subjecting said glass to the crystallization temperature to crystallize said glass by thermal in situ crystallization to form a crystallized glass ceramic material having a low coefficient of lineal thermal expansion and, cooling the glass-ceramic assembly in a predetermined manner to produce the lightweight telescope mirror blank.

7. A lightweight glass plate comprising a plurality of self-fitting glass units, each unit having a pair of oppositely disposed face surfaces and at least one cavity disposed between said face surfaces, one of said face surfaces being provided with at least one opening, said opening communicating with said cavity and the atmosphere and being smaller in cross-sectional area than the cross-sectional area of said cavity, said plurality of units being joined together at their respective side walls by a sealing glass.

8. A lightweight telescope mirror blank comprising a plurality of self-fitting glass units each unit having a pair of oppositely disposed face surfaces and at least one cavity disposed between said face surfaces, one of said face surfaces being provided with at least one opening, said opening communicating with said cavity and the atmosphere and being smaller in cross-sectional area than the cross-sectional area of said cavity, said plurality of units being joined together at their respective side walls by a sealing glass having essentially the same coefficient of lineal thermal expansion as said glass units.

References Cited

UNITED STATES PATENTS

| | | | |
|---|---|---|---|
| 301,329 | 7/1884 | Beck | 65—23 |
| 807,459 | 12/1905 | Harloe | 65—23 |
| 2,086,185 | 7/1937 | Keaney | 65—58 |
| 3,124,470 | 3/1964 | Arthur | 65—36 |
| 3,346,357 | 10/1967 | Baak | 65—36 |

S. LEON BASHORE, Primary Examiner

E. R. FREEDMAN, Assistant Examiner

U.S. Cl. X.R.

65—30, 36, 42, 43, 45; 161—68, 69, 193; 156—89

PO-1050
(5/69)

UNITED STATES PATENT OFFICE
CERTIFICATE OF CORRECTION

Patent No. 3,514,275        Dated May 26, 1970

Inventor(s) T. F. BRAY

It is certified that error appears in the above-identified patent and that said Letters Patent are hereby corrected as shown below:

Col. 5, line 7, "22" should be --21--;

Col. 8, line 45, "1963" should be --1964--;

SIGNED AND
SEALED
DEC 29 1970

(SEAL)
Attest:

Edward M. Fletcher, Jr.
Attesting Officer

WILLIAM E. SCHUYLER, JR.
Commissioner of Patents